United States Patent
Fukami et al.

(10) Patent No.: US 7,237,522 B2
(45) Date of Patent: Jul. 3, 2007

(54) INTAKE SYSTEM FOR COMBUSTION ENGINE

(75) Inventors: Takashi Fukami, Akashi (JP); Tetsuya Mori, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 11/207,224

(22) Filed: Aug. 19, 2005

(65) Prior Publication Data

US 2006/0042603 A1    Mar. 2, 2006

(30) Foreign Application Priority Data

Aug. 25, 2004  (JP)  .............................. 2004-245295
Oct. 19, 2004  (JP)  .............................. 2004-304702

(51) Int. Cl.
    *F02M 35/00*    (2006.01)
(52) U.S. Cl. ................................................ 123/184.24
(58) Field of Classification Search ........... 123/184.24, 123/184.34, 184.42, 184.47
    See application file for complete search history.

(56) References Cited

U.S. PATENT DOCUMENTS

| 6,095,105 A | * | 8/2000 | Lohr et al. ................ 123/90.38 |
| 6,196,186 B1 | * | 3/2001 | Nagasaka et al. ........... 123/336 |
| 6,886,532 B2 | * | 5/2005 | Nohara et al. .............. 123/401 |
| 2004/0079340 A1 | * | 4/2004 | Matsuda et al. ............. 123/472 |
| 2005/0066926 A1 | * | 3/2005 | Ishikawa et al. ........ 123/184.34 |

FOREIGN PATENT DOCUMENTS

JP    2004-060552    2/2004

* cited by examiner

*Primary Examiner*—Marguerite McMahon

(57) ABSTRACT

An intake system for a combustion engine includes an intake passage (12), a suction duct (22) protruding into the intake passage (12) to communicate therewith and having front and rear wall areas (22a and 22b), and a fuel injector (21) positioned upstream of the intake duct (22) for injecting fuel (F) into the suction duct (22). The rear wall area (22b) has a height greater than that of the front wall area (22a).

9 Claims, 5 Drawing Sheets

INTAKE SYSTEM FOR COMBUSTION ENGINE

BACKGROUND OF THE INVENTION

1. Field of the Invention

The present invention relates to an intake system for a combustion engine, particularly that used in a motorcycle.

2. Description of the Prior Art

As a high power combustion engine for racing motorcycles, the combustion engine has hitherto been well known, in which first and second fuel injectors are employed in each of intake passages leading to respective engine cylinders and are operated simultaneously during a high power operation. The first and second fuel injectors are positioned downstream of a throttle valve in a throttle body and upstream of an suction duct protruding into an air cleaner forming a part of the intake passage, respectively. In this combustion engine, the distance between an injection port of the second fuel injector and a combustion chamber of the engine is set relatively long by positioning the second fuel injector within the air cleaner distant from the combustion chamber. This structural feature is effective to facilitate a fine atomization of fuel being injected into the combustion chamber.

However, with compactization of the motorcycle advanced, the fuel intake passages in the conventional intake system are limited as to their size and shape. In particular, since the second fuel injector is arranged above (upstream of) the suction duct that protrudes into the air cleaner as discussed above, the air intake space above the suction duct is limited, resulting in the intake efficiency being lowered. See, for example, the Japanese Laid-open Patent Publication No. 2004-60552.

SUMMARY OF THE INVENTION

In view of the foregoing, the present invention has an object to increase the intake efficiency in an intake system of a combustion engine including at least one fuel injector disposed in an intake passage.

In order to accomplish the foregoing object, the present invention provides an intake system for a combustion engine, which includes an intake passage, an suction duct protruding into the intake passage to communicate therewith and having front and rear wall areas, and a fuel injector positioned upstream of the suction duct for injecting fuel into the suction duct. The rear wall area of the suction duct has a height greater than that of the front wall area.

According to the present invention, since the height of the rear wall area of the suction duct is chosen to be greater than that of the front wall area, the air tending to flow over the suction duct can be more sucked into the suction duct as deflected by the rear wall area higher than the front wall area, as compared with the suction duct having the rear wall area and the front wall area of the same height. In other words, the effective opening area of the suction duct (the intake area through which the air flows into the suction duct) can increase. Thus, more air can be introduced into the suction duct, resulting in increase of the intake efficiency.

It is to be noted that the terms "front" and "rear" used in connection with the respective wall areas of the suction duct are in relation to the geometry of the motorcycle. In particular, the term "front" may represent an upstream region with respect to the direction of flow of the air to be sucked into the suction duct.

In a preferred embodiment of the present invention, an air cleaner is provided in the intake passage and has an air delivery area. The suction duct is disposed in the air delivery area of the air cleaner. Positioning of the suction duct within the air delivery area of the air cleaner is effective to introduce more air into the suction duct from the air delivery area. In such case, the air cleaner may include a box-like cleaner casing having top and bottom walls and the fuel injector and the suction duct may be mounted on the top and bottom walls of the cleaner casing, respectively.

In another preferred embodiment of the present invention, the rear wall area of the suction duct has an upper end held substantially level with or higher than a fuel injection port of the fuel injector. According to this structural feature, the fuel injected from the fuel injection port is prevented from being carried rearward by the air beyond the suction duct, resulting in little leakage of the fuel from the suction duct.

In a further preferred embodiment of the present invention, the suction duct has a pair of side wall areas connecting between the front and rear wall areas. Each of the side wall areas has an upper end curved downwardly thereof to form a dent edge. This is particularly advantageous in that with respect to the direction of flow of the air within the intake passage, the air can be also sucked into the suction duct from laterally thereof and, therefore, more air can be introduced into the suction duct with high intake efficiency.

The suction duct may have an upstream duct portion that is curved to incline forwardly to have an inlet opening directed forwardly upwardly with respect to the direction of flow of the air. According to this structural feature, the air can be smoothly introduced into the suction duct.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Preferred embodiments of the present invention will be described in detail with reference to the accompanying drawings.

Figure 1:
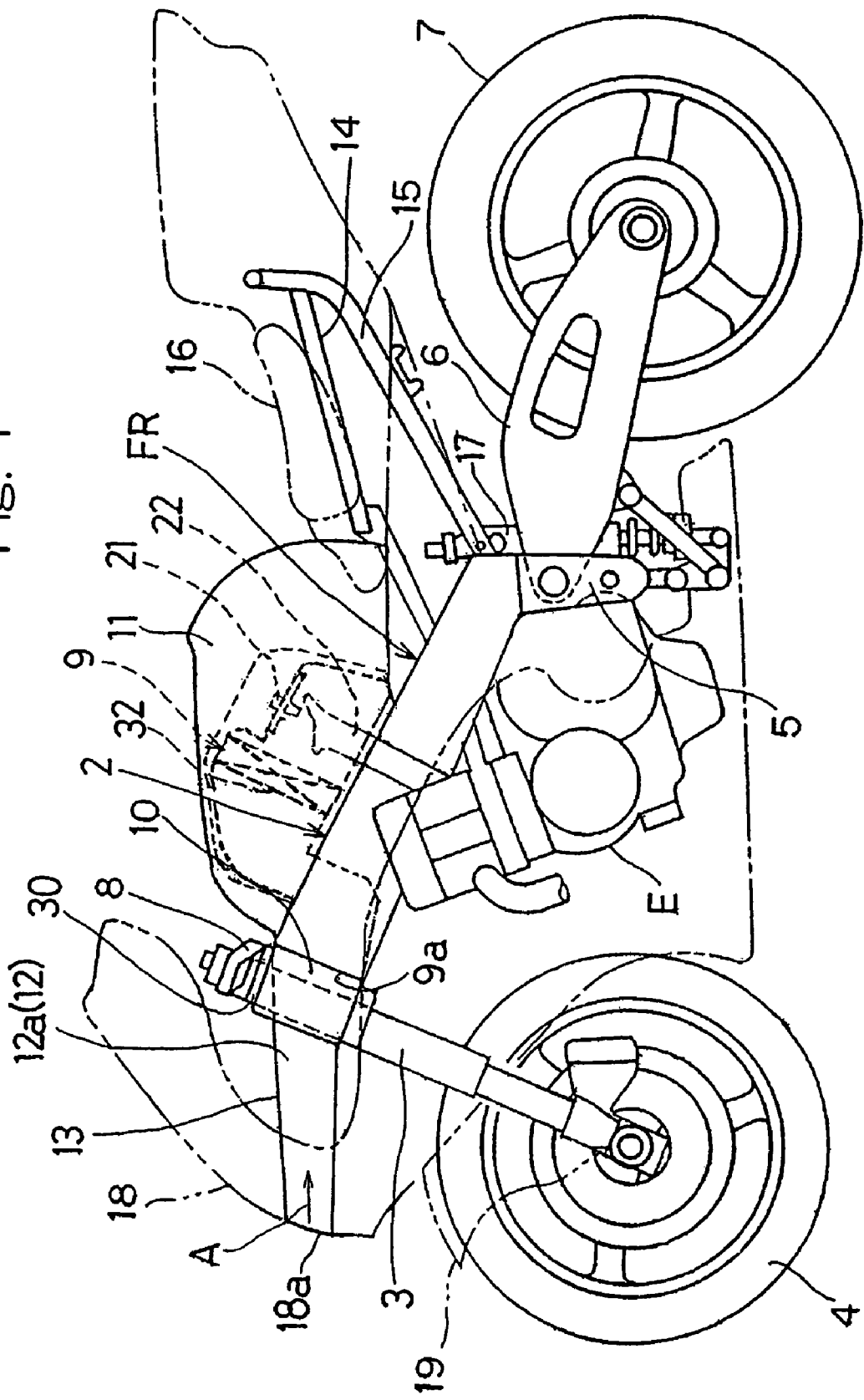
FIG. 1 is a side view of a motorcycle equipped with an intake system for a combustion engine according to a first preferred embodiment of the present invention.

FIG. 1 schematically illustrates a side view of a motorcycle according to a first preferred embodiment of the present invention, showing an entire structure thereof. The motorcycle includes a motorcycle frame structure FR having a head tube 10 formed at a front portion of the motorcycle frame structure FR. A steering front fork assembly 3 is pivotally supported by the head tube 10. A front wheel 4 is rotatably supported by a lower end of the fork assembly 3. The motorcycle frame structure FR has a generally lower intermediate portion provided with swingarm brackets 5, on which a swingarm 6 is pivotally supported for movement up and down. A rear wheel 7 is rotatably supported by the swingarm 6.

Figure 2:
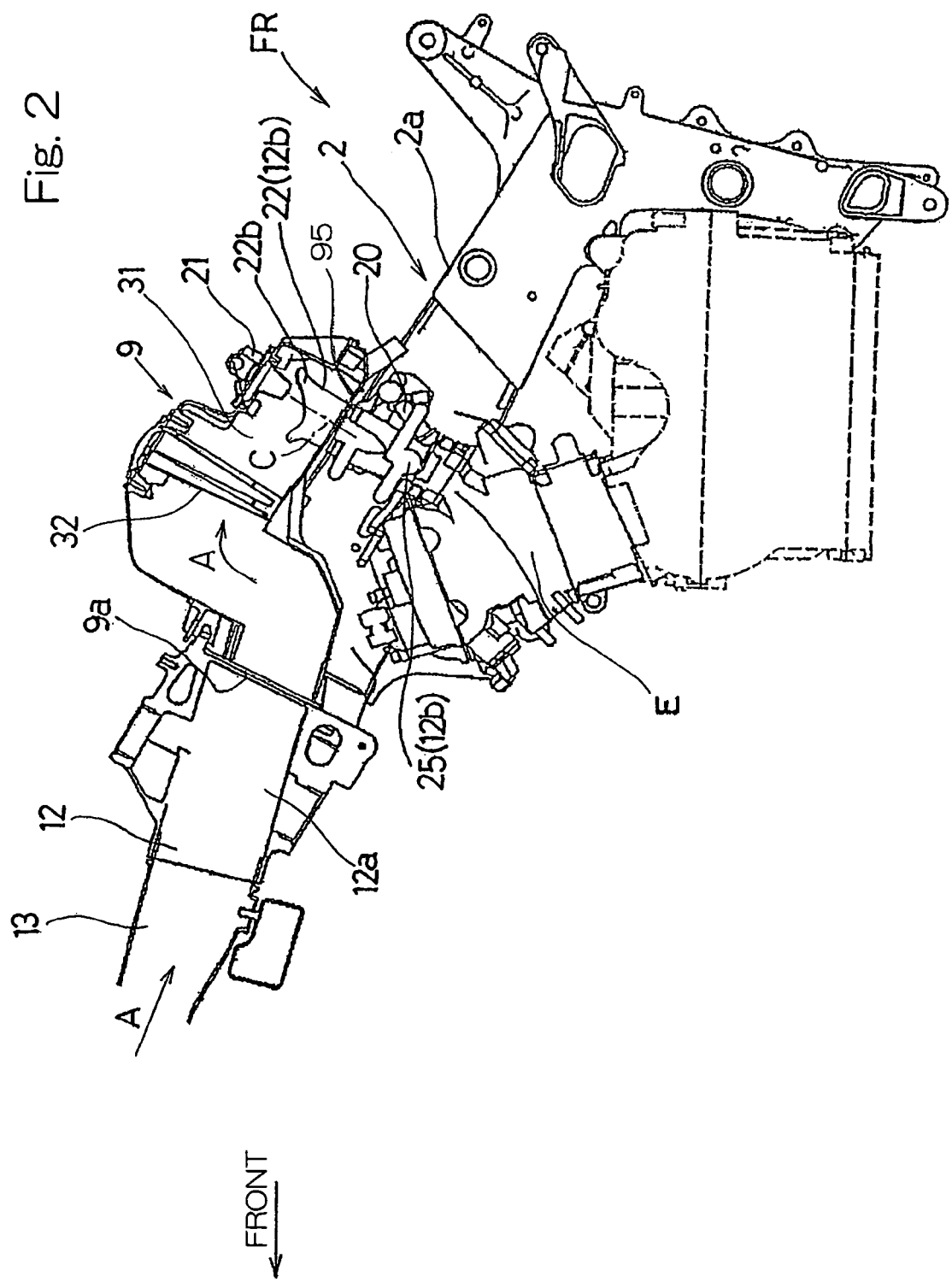
FIG. 2 is a fragmentary side view showing the intake system for the combustion engine and its surroundings.

A combustion engine E is mounted on a generally intermediate portion of the motorcycle frame structure FR and forwardly of the swingarm brackets 5 and has a drive output shaft (not shown) which is drivingly coupled with the rear wheel 7 through a drive transmission chain (not shown) in a manner well known to those skilled in the art. An upper bracket 30 supporting an upper portion of the front fork assembly 3 has a steering handlebar 8 mounted thereon. The motorcycle frame structure FR includes a main frame 2 so forked rearward from the head tube 10 as to form a pair of main frame half portions 2a and 2a (FIG. 2). A fuel tank 11 is mounted on a generally upper intermediate portion of the main frame 2. An air cleaner 9 is carried by the main frame 2 below the fuel tank 11 and above the combustion engine E. A pair of seat rails 14 and a pair of reinforcement rails 15, both forming a rear portion of the motorcycle frame structure FR, are fixed to a rear portion of the main frame 2. A rider seat 16 is mounted on the pair of seat rails 14. A single rear suspension unit 17 is arranged between the motorcycle frame structure FR and the swingarm 6.

A fairing 18 made of a synthetic resin is mounted on a front portion of the motorcycle frame structure FR so as to cover a front portion of the main frame 2 anterior to the handlebar 8 and also cover a lower portion and lateral portions of the combustion engine E. A front mudguard or fender 19 is arranged below a front portion of the fairing 18 so as to extend over the front wheel 4.

The fairing 18 has a front face formed with an air intake opening 18a. An air intake duct 13 is arranged to extend between the air intake opening 18a and an air inlet 9a of the air cleaner 9 for introducing air A rearward from the air intake opening 18a to the air cleaner 9 by way of the air inlet 9a. This air intake duct 13 forms an upstream passage portion 12a of an air intake passage 12 upstream of the air cleaner 9 with respect to the direction of flow of the air A towards the air cleaner 9. The air cleaner 9 has an air delivery area where a suction duct 22 leading to an intake port (not shown) of the combustion engine E protrudes into the air cleaner 9. A fuel injector 21 is arranged upstream of the suction duct 22 protruding into the air cleaner 9. It is to be noted that each of the fuel injector 21 and the suction duct 22 is employed in a number equal to the number of the cylinders employed in the combustion engine E and, accordingly, in the case of the combustion engine E having two cylinders, two fuel injectors 21 and two suction ducts 22 are employed correspondingly.

Figure 3:
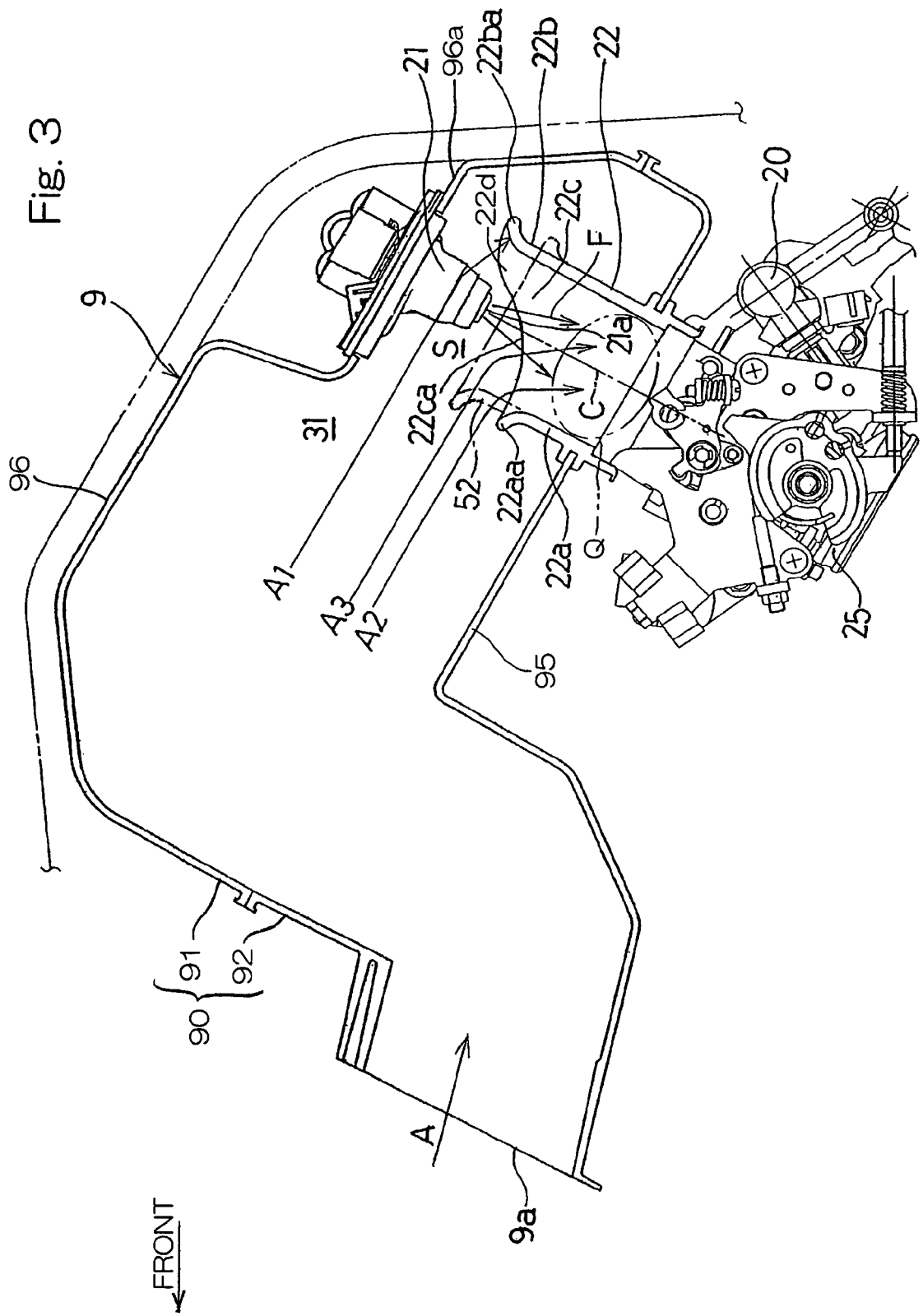
FIG. 3 is a fragmentary longitudinal sectional view showing an essential portion of the intake system.

FIG. 2 illustrates a fragmentary side view of an intake system for the combustion engine E and its surroundings. FIG. 3 illustrates a fragmentary longitudinal sectional view showing an essential portion of the intake system. As shown in FIGS. 2 and 3, the air cleaner 9 is disposed between the main frame half portions 2a and 2a forming the main frame 2. This air cleaner 9 includes a box-like cleaner casing 90 of two-piece construction including upper and lower casing halves 91 and 92 joined together. A cleaner element 32 for purifying the air A is replaceably accommodated within the cleaner casing 90. The suction duct 22 is disposed downstream of the cleaner element 32, that is, disposed within a clean chamber (delivery area) 31 defined within the cleaner casing 90.

The suction duct 22 extends through a bottom wall of the air cleaner 9, that is, a bottom wall 95 of the lower casing half 92 of the cleaner casing 90 for support. This suction duct 22 is communicated with the intake port (not shown) of the combustion engine E through a passage defined within a throttle body 25. The air intake duct 13, the air cleaner 9, the suction duct 22 and the throttle body 25 form the air intake passage 12, with the suction duct 22 and the throttle body 25 forming a downstream passage portion 12b of the air intake passage 12 with respect to the air cleaner 9.

As shown in FIG. 3, the illustrated combustion engine E utilizes a so-called double injector system including a first or primary fuel injector 20 and a second or auxiliary fuel injector 21. The first fuel injector 20 is disposed downstream of a throttle valve (not shown), that is positioned downstream of the suction duct 22. The second fuel injector 21 is disposed at a step portion 96a (FIG. 3) of an upper wall 96 of the air cleaner 9 to confront an inlet opening 22d of the suction duct 22.

The first and second fuel injectors 20 and 21 are controlled by a fuel injection control unit (not shown) that controls fuel injecting timing and amount of fuel to be injected in dependence on the load imposed on the combustion engine E. By way of example, during a low-load operating condition of the combustion engine E, fuel F can be injected only from the first injector 20, but during a high-load operating condition, fuel F can be injected simultaneously from the first and second fuel injectors 20 and 21.

As shown by the double-dotted line in FIG. 3, the suction duct 22 in the illustrated embodiment has a cross-sectional area, taken in a direction perpendicular to the longitudinal axis C of the suction duct 22, which represents an elliptical shape having a major axis lying in a forward and rearward direction, that is, in a direction generally parallel to the longitudinal sense of the main frame assembly 2. Accordingly, where a plurality of suction ducts 22 are laid laterally or in a left and right direction of the combustion engine E in side-by-side relation to each other as is the case with the multi-cylinder combustion engine, the neighboring suction ducts 22 and 22 can be spaced advantageously a considerable distance sufficient to allow a stream of air to flow smoothly without being disturbed by those suction ducts 22 and 22.

The suction duct 22 extending into the clean chamber 31 through the bottom wall 95 includes a front wall area 22a confronting the air A, a rear wall area 22b opposite to the front wall area 22a, and a pair of side wall areas 22c continued from and connecting the front and rear wall areas 22a and 22b. Within the clean chamber 31, the height of the rear wall area 22b is chosen to be greater than that of the front wall area 22a, with an upper end 22ba of the rear wall area 22b positioned at a level higher than the level of an fuel injection port 21a of the fuel injector 21. As such, the fuel injection port 21a of the fuel injector 21, when viewed from laterally as shown in FIG. 3, is held at a level beneath the upper end 22ba of the rear wall area 22b. Also, each of the side wall areas 22c connecting the front and rear side wall areas 22a and 22b has an upper end 22ca that is smoothly curved downwardly or axially inwardly to form a dent edge. The suction duct 22 has its longitudinal axis lying perpendicular to the bottom wall 95 of the cleaner casing 90 and also perpendicular to respective directions of flow of the purified airs A1 to A3 within the clean chamber 31. It is to be noted that the cleaner element 32 shown in FIG. 2 is not shown in FIG. 3 for the sake of brevity.

According to the foregoing embodiment shown in and described with reference to FIGS. 1 to 3, since the second fuel injector 21 is disposed within the air cleaner 9 so as to confront the inlet opening 22d of the suction duct 22, the intake space S above the suction duct 22 becomes small. In contrast thereto, since the rear wall area 22b of the suction duct 22 is so chosen to have a height greater than that of the front wall area 22a, the effective opening area of the suction duct 22 (the intake area through which the purified air flows into the suction duct 22) can increase in effect as compared with the suction duct having the rear wall area 22b and the front wall area 22a of the same height. In other words, the air A1 tending to flow over the suction duct 52, in the case of the conventional suction duct 52 having the rear wall area 22b and the front wall area 22a of the same height as shown by the double-dotted line in FIG. 3, can be deflected in contact with a portion of the rear wall area 22b adjacent the upper end 22ba so as to flow into the suction duct 22 as a result of the increased height of the rear wall area 22b. In addition, the air A2 tending to collide against the front wall 22a of the suction duct 22 can also be guided straightforward into the suction duct 22. As such, the effective opening area of the suction duct 22 can increase enough to allow the airs A1 and A2 to be sucked into the suction duct 22, resulting in increasing the intake efficiency.

Also, since the upper end 22ba of the rear wall area 22b is positioned at a level higher than that of the fuel injection port 21a of the fuel injector 21, the fuel F injected from the fuel injection port 21a is prevented from being carried rearward by the airs A1 to A3 beyond the rear wall area 22b, resulting in little leakage of the fuel F from the suction duct 22. Yet, since the respective upper ends 22ca of the side wall areas 22c of the suction duct 22 are curved downwardly as hereinbefore described, the air A3 flowing laterally of the suction duct 22 with respect to the direction of flow within the air cleaner 9 (the intake passage 12) can also be sucked into the suction duct 22 and, therefore, the increased amount of air can advantageously be sucked into the suction duct 22, resulting in a further increase of the intake efficiency.

Figure 4:
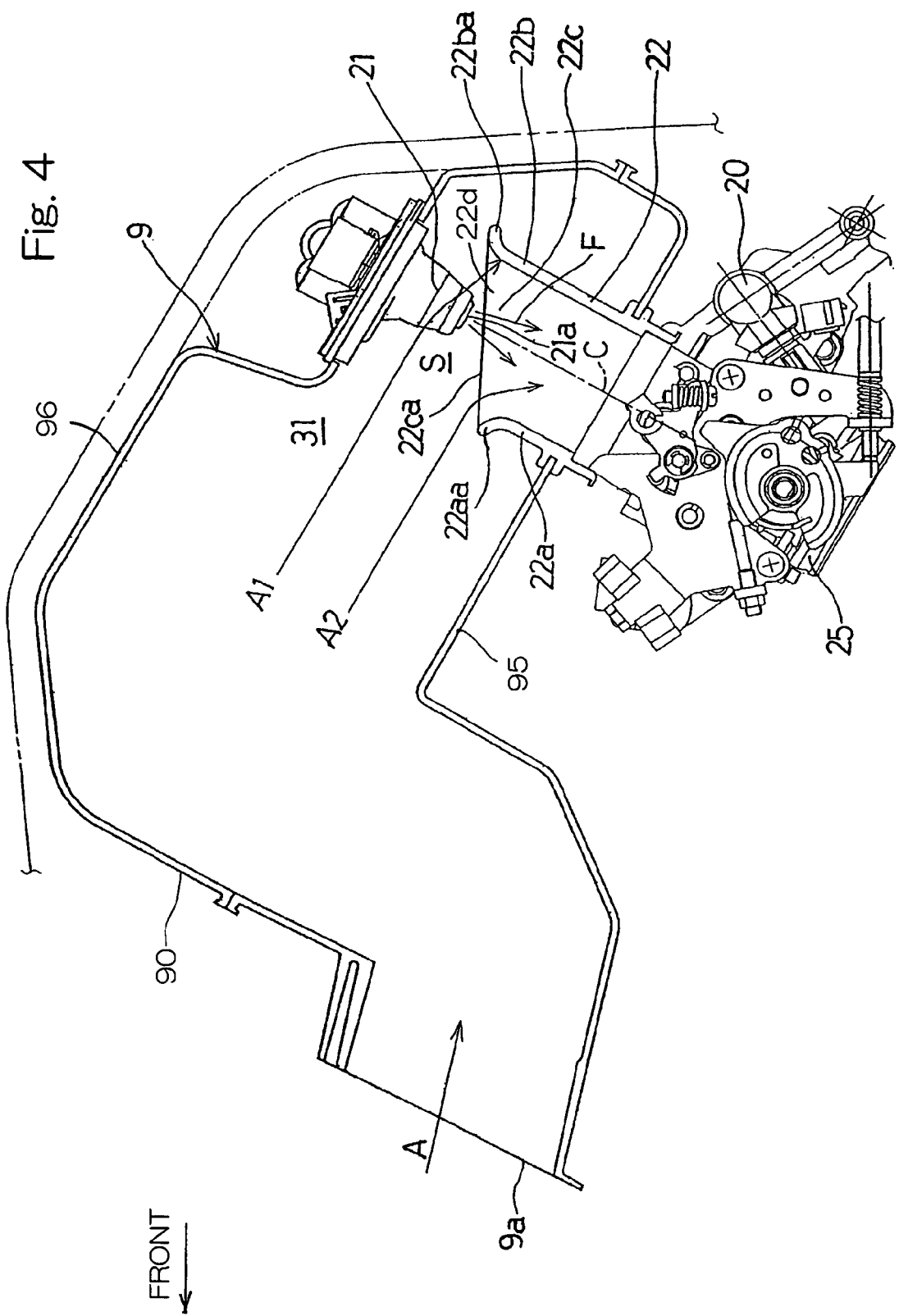
FIG. 4 is a fragmentary longitudinal sectional view of an essential portion of the intake system, according to a second preferred embodiment of the present invention.

FIG. 4 schematically illustrates a view similar to FIG. 3, showing the intake system according to the second preferred embodiment of the present invention. The upper end 22ca of each of the side wall areas 22c of the suction duct 22 extends straight in contrast to the curved configuration employed in the first embodiment. More specifically, when viewed laterally, the upper end 22ca connects the upper end 22aa of the front wall area 22a and the upper end 22ba of the rear wall area 22b while extending straight therebetween.

Even in this second embodiment, since the rear wall area 22b has a height greater than that of the front wall area 22a as is the case with that in the first embodiment, the effective opening area of the suction duct 22 (the intake surface area) can increase in effect, as compared with the suction duct having the rear wall area 22b and the front wall area 22a of the same height. Accordingly, a substantially large amount of air can be sucked into the suction duct 22, resulting in increase of the intake efficiency. In addition, since the upper end 22ba of the rear wall area 22b is positioned at a level higher than that of the fuel injection port 21a of the fuel injector 21, the fuel F injected from the fuel injection port 21a is prevented from being carried rearward by the airs A1 to A3 beyond the rear wall area 22b, resulting in little leakage of the fuel F from the suction duct 22.

It is to be noted that the cleaner element 32 shown in FIG. 2 is not shown even in FIG. 4 for the sake of brevity.

Figure 5:
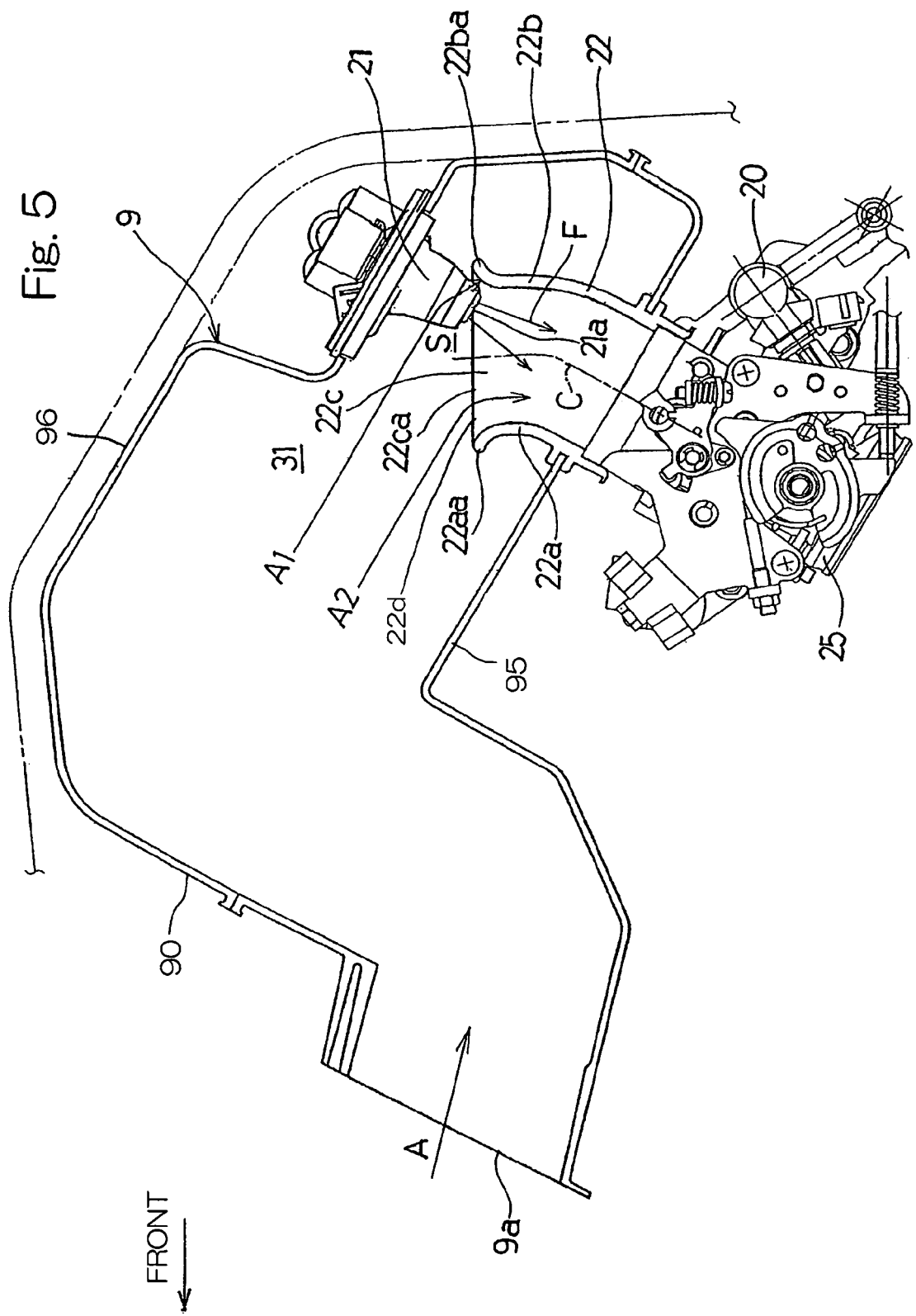
FIG. 5 is a fragmentary longitudinal sectional view of an essential portion of the intake system according to a third preferred embodiment of the present invention.

FIG. 5 illustrates a view similar to FIG. 4, showing the fuel intake system according to a third preferred embodiment of the present invention. This intake system is similar to that of the second embodiment in that the upper end 22ca of the side wall area 22c connects straight the upper end 22aa of the front wall area 22a and the upper end 22ba of the rear wall area 22b. However, the suction duct 22 has its longitudinal axis C in the upstream duct portion smoothly curved or inclined forwardly so that the inlet opening 22d directs forwardly and upwardly to slantwisely encounter to the direction of flow of the air A. Accordingly, the airs A1 and A2 can be smoothly introduced into the suction duct 22.

Even in this third embodiment, the rear wall area 22b is chosen to have a height greater than that of the front wall area 22a and the upper end 22ba of the rear wall area 22 is held at a level higher than that of the fuel injection port 21a of the fuel injector 21. Accordingly, not only can the amount of the air being introduced into the suction duct 22 be increased with the consequent increase in intake efficiency, but also the fuel F injected from the fuel injection port 21a is prevented from being carried rearward by the airs A1 and A2 beyond the rear wall area 22b, resulting in little leakage of the fuel F from the suction duct 22.

It is to be noted that in FIG. 5, the cleaner element 32 shown in FIG. 2 is not shown for the sake of brevity.

When the intake system according to any one of the foregoing embodiments is employed in the multi-cylinder combustion engine, the suction ducts 22 communicated with respective engine cylinders may be arranged to have different passage lengths chosen in consideration of, for example, intake inertias. By so doing, the intake efficiency can be further increased.

Also, although in any one of the foregoing embodiments the suction duct 22 has been shown and described as having an elliptical cross-sectional area lying perpendicular to the longitudinal axis thereof, the cross-sectional shape of the suction duct 22 may not be always limited to the elliptical shape, but may have, for example, a round cross-sectional shape, an oval shape, a rectangular shape, a rhomboidal shape or any other shape.

Yet, although in any one of the foregoing embodiments, the upper end 22ba of the rear wall area 22b of the suction duct 22 has been described as held at the level higher than that of the fuel injection port 21a of the fuel injector 21, the upper end 22ba may be held substantially at a level with or held at a level slightly higher than that of the fuel injection port 21a of the fuel injector 21, provided that the fuel F injected from the fuel injection port 21a will not leak outside the suction duct 22.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. An intake system for a combustion engine, which comprises:
   an intake passage extending through a bottom wall of an air cleaner;
   a suction duct protruding into the intake passage to communicate therewith, and having front wall area on an upstream side of air flow in the air cleaner and rear wall area opposite to the front wall area; and a fuel injector positioned in the air cleaner so as to confront an inlet opening of the suction duct for injecting fuel into the suction duct;

wherein the rear wall area has a height, measured along a longitudinal axis of the suction duct and from the bottom wall of the air cleaner, greater than a height of the front wall area, and wherein the rear wall area of the suction duct has an upper end held substantially at a level with or higher than a fuel injection port of the fuel injector.

2. The intake system for the combustion engine as claimed in claim 1, further comprising an air cleaner provided in the intake passage and having an air delivery area and wherein the suction duct is disposed in the air delivery area of the air cleaner.

3. The intake system for the combustion engine as claimed in claim 2, wherein the air cleaner includes a box-like cleaner casing having top and bottom walls and wherein the fuel injector is mounted on the top wall of the cleaner casing and the suction duct is mounted on the bottom wall of the cleaner casing.

4. The intake system for the combustion engine as claimed in claim 1, wherein the suction duct also has a pair of side wall areas continuously connecting between the front and rear wall areas, each of the side wall areas having an upper end curved downwardly, viewed from laterally, to form a dent edge.

5. The intake system for the combustion engine as claimed in claim 1, the suction duct has an upstream duct portion that is curved to incline forwardly to have an inlet opening forwardly upwardly with respect to a direction of flow of the air.

6. The intake system for the combustion engine as claimed in claim 1, further comprising an additional fuel injector disposed downstream of the suction duct in the intake passage.

7. The intake system for the combustion engine as claimed in claim 1 wherein the suction duct has an elliptical cross sectional shape relative to the air flow.

8. The intake system for the combustion engine as claimed in claim 1 wherein the fuel injector is mounted on a housing of the air cleaner and aligned off center with a longitudinal axis C of the suction duct.

9. The intake system for the combustion engine as claimed in claim 1 wherein the fuel injector is mounted on a housing of the air cleaner so that the fuel is released from the fuel injector above an entrance of the suction duct.

* * * * *